May 15, 1951      R. B. LIGHTFOOT      2,552,727
METHOD OF BALANCING ROTOR BLADES
Filed Aug. 28, 1945
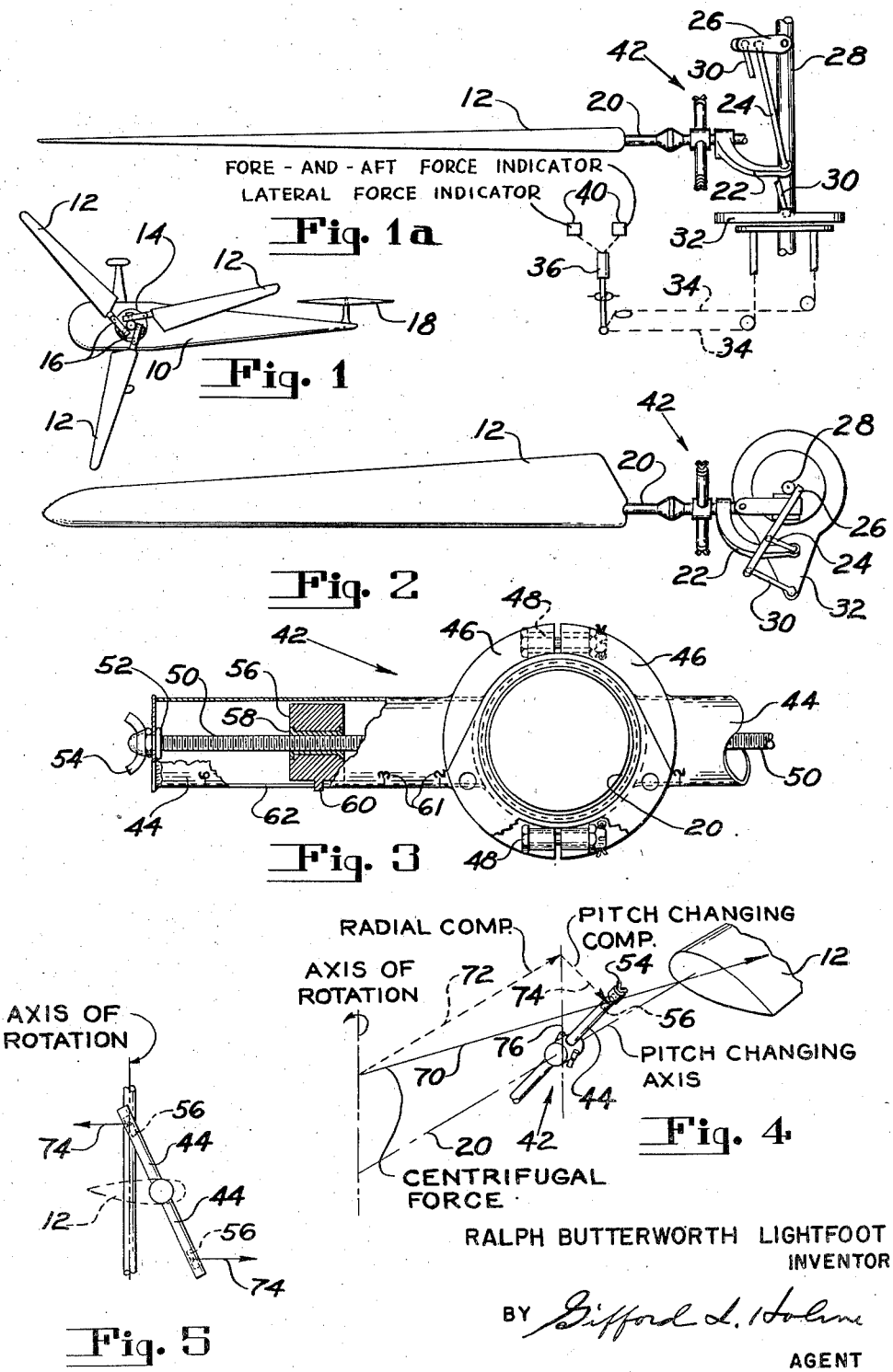
RALPH BUTTERWORTH LIGHTFOOT
INVENTOR
BY *Gifford L. Holme*
AGENT Patented May 15, 1951

2,552,727

UNITED STATES PATENT OFFICE 2,552,727

METHOD OF BALANCING ROTOR BLADES

Ralph B. Lightfoot, Stratford, Conn., assignor to United Aircraft Corporation, East Hartford, Conn., a corporation of Delaware Application August 28, 1945, Serial No. 613,190

4 Claims. (Cl. 73—66)

This invention relates to means and method for dynamically balancing rotor blades of a multi-bladed rotor for aircraft commonly referred to as helicopters. The device is adapted for use on that type of helicopter in which the pitch of the rotor blades is changed cyclically as they rotate in forward flight.

The device may be installed upon a spar of a rotor blade and adjusted thereon in accordance with readings, taken by conventional instruments, of the action of the control connections to a rotor blade so as to correct the dynamic pitching moment of a blade when it is rotated and balance the same with the dynamic pitching moment of the other blades and thus provide a balanced blade system in which no loads are transmitted from the blades to the stick in flight due to the pitching moments of the cyclically controlled blades.

By dynamic pitching moment is meant the moment taken around the feathering axis of the blade resulting from the centrifugal forces acting on the elements of the blade throughout its span when the blade is rotated around the upstanding drive shaft of the helicopter. The physical manifestation of this dynamic pitching moment results in a vertical force in the push rod connection between the blade horn and the swashplate through which the blade pitch is controlled.

An object of this invention, therefore, is to provide means and a method for balancing pitching moments and/or damping vibrations in rotor blades for rotary wing aircraft.

Another object is to provide readily adjustable means for carrying out the above object.

Other objects and advantages reside in the details of construction of the device and will be either pointed out or obvious from the following specification and claims.

In the drawing:

Fig. 1 is a diagrammatic plan view of a multi-bladed helicopter;

Fig. 1A is a diagrammatic view of one rotor blade with its control connections to the manual control stick;

Fig. 2 is a plan view of the structure shown in Fig. 1A;

Fig. 3 is a sectional view of the spar of the rotor blade with the pitching moment compensator and damper mounted thereon with parts in section to show the adjustment;

Fig. 4 is a vector diagram of the forces acting upon a rotor blade for adjusting the pitching moment in response to centrifugal force due to rotation of the blade about the helicopter drive shaft axis; and Fig. 5 is a diagrammatic view showing the pitch changing components of centrifugal force on the compensator acting as a couple around the rotor blade spar or feathering axis under dynamic conditions due to rotation around the helicopter drive shaft axis.

Referring more in detail to the drawings in Fig. 1, a helicopter 10 is provided with a plurality of blades 12 mounted upon a hub 14 by drag hinges 16. A tail rotor 18 is arranged with respect to the body of the helicopter 10 to counteract the torque of the blades 12.

In Figs. 1A and 2, a blade 12 is mounted on a spar 20 which may be rotated by a control horn 22 through a rod 24 connected with a link 26 that may be positioned at either of its ends by a total pitch rod 28 or a cyclic pitch rod 30 carried upon a tiltable star 32 that is positioned by cables 34 from a universally pivoted azimuthal control stick 36. The total pitch control stick has not been shown because, for purposes of test of the pitching moment compensator to be described below, the total pitch stick is locked in position and the forces are measured by conventional force indicating instruments 40 to record forces which are fed from the blade 12 through the cyclic pitch control linkage recited above to the control stick 36. For testing purposes, the control stick 36 is retained in position by the instruments 40.

A pitching moment adjustment mechanism is represented by the reference character 42 in Figs. 1A and 2 and shown in detail in Fig. 3. The mechanism 42 comprises a pair of tubes 44 containing similarly constructed parts only one of which will be described. The tubes 44 are carried by arcuate segment collars 46 secured together by bolts 48. The bolts 48 may be loosened and the collars 46 rotated around the spar to change the position of the tubes 44. An adjustment screw 50 is mounted on a collared pivot 52 provided with wings 54 which may be turned to rotate the screw 50. A weight 56 has a screw-threaded inner sleeve 58 that mates with the screw 50, and a projection 60 which rides in a slot 62 in the tube 44. Indicia 61 cooperate with the projection 60 to indicate the position of the weight 56. When the wings 54 are turned, the weight 56 will be moved along in the tube 44 to change the effectiveness of the weight 56 in obtaining a pitch moment compensating force.

In Fig. 4, the blade 12 is assumed to be rotating around the axis of rotation as indicated by the arrow. The weight 56 in the tube 44 is shown as tilted upwardly and backwardly from the centerline of the spar 20. The lower weight 56 could have its forces represented similarly as the two weights 56 act to provide a couple as shown in Fig. 5, but only the forces acting upon one weight will be described for purposes of clarity.

The centrifugal force acting upon the weight 56 will act directly outwardly from the axis of rotation and is represented by the line 70 having the reference "Centrifugal Force." Inasmuch as the spar 20 mounts the tube 44 of the pitch moment compensating mechanism 42, the centrifugal force will be broken up into two components, one taken laterally by the spar 20 as represented by the line 72 bearing the reference "Radial Component." By completing the force triangle, a pitch changing component as indicated at 74 in Fig. 4 will be created due to the angle of the tubes 44 with a line 76 parallel to the axis of rotation. The magnitude of this force can be changed by changing the position of the weight 56 by rotating the wings 54 as pointed out in connection with Fig. 3.

In Fig. 5 which is a view looking from the blade 12 toward the axis of rotation, the tubes 44 carrying weights 56 will exert a pitch increasing couple indicated by arrows representing the pitch changing components 74 due to blade rotation about the axis of rotation of the helicopter drive shaft.

In the operation of the device described above, the control stick 36 is held in place by the indicating mechanisms 40. These force indicating instruments indicate the load on the stick, one indicating the lateral stick load and the other the fore and aft stick load. The rotor blades 12 are caused to rotate by an engine, not shown, and readings of the vibrations fed from the blades 12 to the control stick 36 are taken. Thereafter, the blades 12 are stopped and the pitch compensating mechanism 42 is adjusted on one of the blades 12. Thereafter another run is tried under substantially the same load conditions for the blades 12 and a second reading is taken. This second reading compared with the first reading will indicate whether a given vibration has been aggravated or diminished by the adjustment. Thereafter, the mechanism 42 can be adjusted by loosening the bolts 48 and rotating the collars 46 about the spar to a position to reduce the vibration towards the minimum. Also the magnitude of the pitching moment of the blade can be adjusted by the screws 50, by using the indicia 61, so that a finer adjustment can be made without further runs once an operator becomes skilled in the use of the present device.

The present device also can serve to absorb transient blade vibrations as the blade rotates because of the fact that the weights 56 are spaced from the spar 20 and offer rotational inertia to pitch change of the blade around the spar or feathering axis opposite to their own moment, as pointed out above. Thus, for an upsetting force caused by aerodynamic conditions tending to rotate a blade 12, the mechanism 42 will resist such force due to inertia. Inasmuch as such vibrations are usually cyclic in nature in rotary wing aircraft in flight, the weights 56 can be adjusted both radially around the spar and axially along the screws 50 to maintain substantially a constant dynamic pitch reducing moment but a different damping characteristic.

While only one device connected with one blade has been shown and described in detail, it is obvious that all of the blades may contain such a dynamic pitching moment compensator, or only some of the blades need be so equipped to obtain the objects of the present invention. It is also obvious that the present device can be used to give a dynamic pitch decreasing moment rather than a dynamic pitch increasing moment as described by moving the weights 56 into the other quadrants around the spar 20. It can readily be seen that if the dynamic pitching moments of all the blades of a rotor are not equal in magnitude and direction, these forces will be transmitted into the swashplate as a vertical vibration which will in turn be transmitted to the stick as a rotary motion. Of course it will be readily understood that the static moment of the weights around the feathering, or spar axis, of the blade will be of no concern inasmuch as when the rotor is stationary these static moments of the weights cannot transmit any vibrational forces to the controls. Of course these static forces are relatively insignificant when compared with the dynamic forces which these weights may produce during rotation of the rotor. It is also to be noted that the dynamic pitch changing moment around the feathering, or pitch changing, axis due to the mechanism 42 follows a trigonometric function attaining a minimum when the weights 56 lie in the plane of rotation of the blade 12 and also when they are perpendicular to that plane, and a maximum at 45° in each quadrant.

From the foregoing, it is obvious that many modifications of the present invention will occur to those skilled in the art. For this reason, I wish not to be limited in my invention only to that form shown and described but by the scope of the following claims.

I claim:

1. The method of measuring and balancing the dynamic pitch changing moments of the several blades of a rotating multi-bladed rotor for rotary wing aircraft provided with an azimuthal control system for cyclically feathering said blades about their pitch changing axes comprising, rotating said blades about the rotor axis and measuring the cyclic forces upon said system resulting from unequal dynamic pitch changing moments of said blades while the latter are rotating, positioning a weight on each blade on an axis perpendicular to the pitch changing axis of the blade and displaced from the plane of the chord of said blade, rotating said blades about the rotor axis and measuring the cyclic forces upon said system including the change of dynamic pitching moment resulting from said displaced weight, and re-positioning said weights toward and away from the chord planes of their respective blades so as to make the dynamic pitch changing moments around the feathering axes of the several blades substantially equal in magnitude and direction.

2. The method of measuring and balancing the dynamic pitch changing moments of the several blades of a rotating multi-bladed rotor for rotary wing aircraft provided with an azimuthal control system for cyclically feathering said blades comprising, rotating said blades about the rotor axis and measuring the unbalanced forces upon said control system resulting from the unequal dynamic moments of said blades about their pitch changing axes while the latter are rotating, positioning a weight on at least one of said blades displaced from the plane of the chord thereof and located in a quadrant about the feathering axis of the blade producing a dynamic pitch increasing moment in said blade about its feathering axis, rotating said blades about the rotor axis and again measuring the unbalance of the forces acting upon said system, noting the change in the unbalance due to the change in position of said weight and re-positioning said weight so as to reduce the unbalanced dynamic movements.

3. The method of measuring and balancing the dynamic moments around the feathering axis of a rotor blade of a sustaining rotor for rotary wing aircraft provided with an azimuthal control system for cyclically feathering said blades comprising, rotating said blade about the rotor axis and measuring the forces in said control system, placing a weight on the blade displaced from the plane of the chord of said blade and located in a quadrant producing a dynamic pitch increasing moment about the feathering axis of the blade, again rotating said blade and measuring the forces upon said system, noting the change in forces due to said weight, and altering the dynamic moment of said weight around the feathering axis of the blade to reduce the control forces in the system.

4. The method of balancing the dynamic moments around their feathering axes of several blades of a multi-bladed rotor for rotary wing aircraft provided with an azimuthal control system for cyclically feathering said blades comprising, rotating said blades about the rotor axis and measuring the forces in said control system, positioning a weight on each blade transversely of said blades displaced from the plane of the chord of the respective blades and located in a quadrant about the feathering axis of the blade producing a dynamic pitch increasing moment in said blade about its feathering axis, rotating said blades about the rotor axis and measuring the forces upon said system due to the position of said weights as said blades rotate, noting the change in forces due to said weights, and altering the dynamic moment of one or more of said weights around the feathering axes of the blades in a direction to compensate for the unbalanced forces and minimize them at the operating blade pitch range in said control system.

RALPH B. LIGHTFOOT.

REFERENCES CITED

The following references are of record in the file of this patent:

UNITED STATES PATENTS

| Number | Name | Date |
| --- | --- | --- |
| 1,610,487 | Grinton | Dec. 14, 1926 |
| 1,880,313 | Charavay | Oct. 4, 1932 |
| 2,048,326 | Dyer et al. | July 21, 1936 |
| 2,076,090 | Myers | Apr. 6, 1937 |
| 2,161,699 | Cierva | June 6, 1939 |
| 2,193,628 | Hem | Mar. 12, 1940 |
| 2,338,293 | Martin | Jan. 4, 1944 |
| 2,343,383 | Martin et al. | Mar. 7, 1944 |
| 2,380,583 | Cierva | July 31, 1945 |
| 2,388,705 | Reiber | Nov. 13, 1945 |
| 2,394,766 | Halford | Feb. 12, 1946 |
| 2,451,541 | Doman | Oct. 19, 1948 |
| 2,465,007 | Bragdon et al. | Mar. 22, 1949 |

FOREIGN PATENTS

| Number | Country | Date |
| --- | --- | --- |
| 365,027 | Great Britain | Jan. 14, 1932 |